United States Patent [19]

Wong et al.

[11] Patent Number: 5,508,057
[45] Date of Patent: Apr. 16, 1996

[54] PROCESS OF MAKING MONOMODAL NUT BUTTERS AND SPREADS

[75] Inventors: Vincent Y. Wong, Hamilton; Mark D. Theurer, Cincinnati; Richard J. Sackenheim, Hamilton, all of Ohio

[73] Assignee: The Procter & Gamble Company, Cincinnati, Ohio

[21] Appl. No.: 372,280

[22] Filed: Jan. 12, 1995

[51] Int. Cl.$^6$ .......................................... A23L 1/38
[52] U.S. Cl. .......................... 426/633; 426/519; 426/654; 426/658
[58] Field of Search ...................................... 426/633, 519, 426/654, 658

[56] References Cited

U.S. PATENT DOCUMENTS

| | | | |
|---|---|---|---|
| 3,317,325 | 5/1967 | Durst | 99/126 |
| 3,619,207 | 11/1971 | Dzurik et al. | 99/128 |
| 4,000,322 | 12/1976 | Billerbeck et al. | 426/72 |
| 4,004,037 | 1/1977 | Connick | 426/324 |
| 4,273,795 | 6/1981 | Bosco et al. | 426/602 |
| 4,329,375 | 5/1982 | Holloway, Jr. et al. | 426/632 |
| 4,814,195 | 3/1989 | Yokoyama et al. | 426/633 |
| 4,828,868 | 5/1989 | Lasdon et al. | 426/633 |
| 5,079,027 | 1/1992 | Wong et al. | 426/633 |
| 5,230,919 | 7/1993 | Walling et al. | 426/633 |

*Primary Examiner*—Helen Pratt
*Attorney, Agent, or Firm*—Tara M. Rosnell; Eric W. Guttag; Rose Ann Dabek

[57] ABSTRACT

A novel nut paste having a particular monomodal particle size distribution and to monomodal full-fat nut butters and monomodal reduced fat nut spreads which contain the novel nut paste and which, as a result, have superior fluidity, texture and flavor which comprises from about 50% to 100% of a nut paste. The Casson plastic viscosity of the nut paste is less than about 15 poise and the fat content of the nut paste is at least about 45%, and it has a fat content ranging from about 25% to about 80%. The final nut butters and nut spread products of the present invention have a Casson plastic viscosity of less than about 17 poise and a yield value below about 300 dynes per square centimeter. The water insoluble solids have a monomodal particle size distribution such that at least about 90% of the water insoluble solids comprising the nut butter or spread have a particle size of less than about 21.6 microns, at least about 85% of the water insoluble solids comprising the nut butter or spread have a particle size of less than about 16.7 microns, at least about 75% of the water insoluble solids comprising the nut butter or spread have a particle size of less than about 13.0 microns, at least about 60% of the water insoluble solids comprising the nut butter or spread have a particle size of less than about 10.1 microns, at least about 45% of the water insoluble solids comprising the nut butter or spread have a particle size of less than about 7.9 microns and at least about 30% of the water insoluble solids comprising the nut butter or spread have a particle size of less than about 6.2 microns. The particles size distribution curve of the water insoluble solids comprising the nut butter or spread is centered at from about 7 microns to about 9 microns.

10 Claims, No Drawings

5,508,057

PROCESS OF MAKING MONOMODAL NUT BUTTERS AND SPREADS

FIELD OF THE INVENTION

The present invention relates to a novel nut paste wherein the water insoluble solids have a particular monomodal particle size distribution and to monomodal nut butters and spreads which are prepared from the nut paste. Processes for preparing the novel nut paste and for preparing the nut butters and nut spreads containing the nut paste are also described.

BACKGROUND OF THE INVENTION

Peanut butters and peanut spreads are ordinarily composed of peanut paste (that is, size-reduced roasted peanuts), stabilizer, and optionally of emulsifier, sweetener, salt and other ingredients. A number of different types of peanut pastes, each with distinct advantages and disadvantages, have been used in the past to prepare peanut butters and peanut spreads.

For example, analysis of current (full fat) peanut butter products shows the particle size distribution of the solids contained therein to be primarily two different ranges. One distribution curve is composed of particles in the range of from about 18 microns to about 118 microns, with the central portion of the distribution being between about 24 and 118 microns in size. The second particle size distribution range is primarily between about 3 microns and about 14 microns with the major distribution being between 5 and 11 microns. This distribution is bimodal, i.e., two distribution curves which overlap. Reduced fat peanut spreads made from peanut paste wherein the solids have a bimodal particle spread have also been disclosed. See, for example, Walling et al; U.S. Pat. No. 5,230,919: Issued Jul. 27, 1993.

Nut butters and spreads, particularly reduced fat nut spreads, are typically prepared by adding solid diluents to the peanut paste. It is desirable that the solid diluents be water soluble for two reasons. First, water soluble solids have less of an impact on the fluidity of the paste than water insoluble solids. Second, water soluble solids facilitate mastication and decrease the total amount of solids perceived in the mouth. Unfortunately, the addition of the water soluble solids to peanut pastes with bimodal particle size distribution results in several product negatives. In particular, the product becomes very viscous (hard to spread), gritty (coarse particles of the added solids) and flavor is lost as a result of the need to intensely mix the solids with the paste. Furthermore, the viscosity/fluidity of peanut pastes having a bimodal particle size distribution are highly sensitive to fat content: i.e., the viscosity increases significantly as the fat content is lowered, so it is especially difficult to prepare a fluid, reduced fat nut spread from a bimodal peanut paste.

It has been found that the fluidity of reduced calorie nut butters and spreads can be increased by roll milling the solids comprising the nut paste to a monomodal particle size distribution. See Wong et al.: U.S. Pat. No. 5,079,027: Issued Jan. 7, 1992. Wong et al disclose low fat nut butters wherein the solid ingredients have a monomodal particles size distribution which are prepared by roll milling defatted peanut solids. The nut paste disclosed by Wong et al. have a particle size in which the major distribution (80% or more) of solid particles have a particle size of 18 microns or less, and preferably wherein 90% of the solid particles are less than 13 microns.

Unfortunately, as a result of the use of defatted peanuts and as a result of the intense processing conditions to which the nut paste is subjected, the nut spreads of the type described by Wong often have inferior flavor compared to full fat nut butters. Moreover, the milling process can result in a nut butter product which has too fine particles. The effect of producing too many fine particles is that the product spreadability is less than desirable.

It has now been found that lull fat nut butters and reduced fat nut spreads having superior fluidity, texture and flavor can be prepared by utilizing the particular monomodal nut paste of the present invention.

SUMMARY OF THE INVENTION

The present invention relates to a novel nut paste having a particular monomodal particle size distribution and to monomodal full-fat and reduced fat nut butters and spreads which contain the novel nut paste and which, as a result, have superior fluidity, texture and flavor.

These nut butters and nut spreads typically comprise from about 50% to about 100% of a nut paste. The nut paste comprises water insoluble solids which have a monomodal particle size distribution such that at least about 80% of the water insoluble solids comprising the nut paste have a particle size of less than about 21.6 microns, at least about 75% of the water Insoluble solids comprising the nut paste have a particle size of less than about 16.7 microns, at least about 65% of the water insoluble solids comprising the nut paste have a particle size of less than about 13.0 microns, at least about 55% of the water insoluble solids comprising the nut paste have a particle size of less than about 10.1 microns, at least about 45% of the water insoluble solids comprising the nut paste have a particle size of less than about 7.9 microns and at least about 30% of the water insoluble solids comprises the nut paste have a particle size of less than about 6.2 microns. The particle size distribution curve of the water insoluble solids comprising the nut paste is centered at from about 7 microns to about 9 microns. The Casson plastic viscosity, of the nut paste is less than about 15 poise and the fat content of the nut paste ranges from about 45% to about The nut butters and nut spreads of the present invention typically have a fat content ranging from about 25% to about 80%. The final nut butters and nut spread products of the present invention have a Casson plastic viscosity of less than about 17 poise and a yield value below about 300 dynes per square centimeter. The water insoluble solids present in the nut butters and spreads of the present invention have a monomodal particle size distribution such that at least about 90% of the water insoluble solids comprising the nut butter or paste have a particle size of less than about 21.6 microns, at least about 85% of the water insoluble solids comprising the nut butter or spread have a particle size of less than about 16.7 microns, at least about 75% of the water insoluble solids comprising the nut butter or spread have a particle size of less than about 13.0 microns, at least about 60% of the water insoluble solids comprising the nut butter or spread have a particle size of less than about 10.1 microns, at least about 45% of the water insoluble solids comprising the nut butter or spread have a particle size of less than about 7.9 microns and at least about 30% of the water insoluble solids comprising the nut butter or spread have a particle size of less than about 6.2 microns. The particles size distribution curve of the water insoluble solids comprising the nut butter or spread is centered at from about 7 microns to about 9 microns.

The present invention also relates to a process for preparing the nut paste hereinbefore described and to batch and continuous processes for preparing the nut butters and nut spreads described herein.

DETAILED DESCRIPTION OF THE INVENTION

The present invention relates to a novel nut paste having a particular monomodal particle size distribution and to monomodal full-fat nut butters and monomodal reduced fat nut spreads which contain the novel nut paste and which, as a result, have superior fluidity, texture and flavor.

It has been discovered that obtaining the particular monomodal particle size distribution described herein for the water insoluble solids comprising the nut butter or spread is key to making a nut spread having superior fluidity, texture and flavor. It has also been discovered that in order to obtain the particular monomodal particle size distribution for the water insoluble solids comprising the nut butter, it is highly desirable to mill the water insoluble solids in the nut paste (which contains the majority of the water insoluble solids present in the nut spread) to the monomodal particle size distribution described herein before appreciable amounts of the added solids are mixed in. Water insoluble solids have a greater impact on fluidity than do water soluble solids because of their ability to bind and trap fat. Breaking down the water insoluble solids early on in the process results in a significant increase in the fluidity of the paste, which then facilitates the admixing of the remaining solids.

The nut paste and nut spreads and nut butters of the present invention, as well as processes for making each are described in detail as follows.

I. The Nut Paste

The invention herein relates in part to a novel nut paste having a particular monomodal particle size distribution. While this invention will be generally described in terms of peanuts and peanut paste, it should be readily apparent that other materials such as almonds, pecans, walnuts, cashews, filberts, macadamia nuts, brazilians. sunflower seeds, sesame seeds, pumpkin seeds, and soybeans could be used to form the nut paste utilized in the nut butters and nut spreads of the present invention. The nut paste herein comprises from about 80 to 100% ground nuts, preferably from about 85 to 100% nuts and most preferably from about 90% to 100% ground nuts.

In addition, the nut paste can optionally contain other water insoluble solids including, but not limited to, protein from any grain or animal source, starches, and fibers. The nut paste could also optionally contain water soluble solids including, but not limited to, emulsifier, hardstock, flavorant, sweetener and salt. In general, water insoluble solids include those solids that are capable of binding fats in more than one way. For example, water insoluble solids may bind fat onto their surface and/or may absorb fat into their interior. By contrast, water soluble solids are those solids which are capable of binding fats in only one way (e.g., by binding fat onto their surface). The nut paste could also contain oil soluble ingredients including, but not limited to, emulsions, hardstocks and vegetable or animal oil sources.

The water insoluble particles comprising the nut paste herein must have a monomodal particle size distribution such that at least about 80% of the water insoluble solids comprising the nut paste have a particle size of less than about 21.6 microns, at least about 75% of the water insoluble solids comprising the nut paste have a particle size of less than about 16.7 microns, at least about 65% of the water insoluble solids comprising the nut paste have a particle size of less than about 13.0 microns, at least about 55% of the water insoluble solids comprising the nut paste have a particle size of less than about 10.1 microns, at least about 45% of the water insoluble solids comprising the nut paste have a particle size of less than about 7.9 microns and at least about 30% of the water insoluble solids comprises the nut paste have a particle size of less than about 6.2 microns. Preferably, at least about 85% of the water insoluble solids comprising the nut paste have a particle size of less than about 21.6 microns, at least about 80% of the water insoluble solids comprising the nut paste have a particle size of less than about 16.7 microns, at least about 70% of the water insoluble solids comprising the nut paste have a particle size of less than about 13.0 microns, at least about 60% of the water insoluble solids comprising the nut paste have a particle size of less than about 10.1 microns, at least about 47% of the water insoluble solids comprising the nut paste have a particle size of less than about 7.9 microns, at least about 30% of the water insoluble solids comprises the nut paste have a particle size of less than about 6.2 microns and a least about 16% of the water insoluble particles comprising the nut paste have a particle size of less than about 4.8 microns. Most preferably, at least about 90% of the water insoluble solids comprising the nut paste have a particle size of less than about 21.6 microns, at least about 85% of the water insoluble solids comprising the nut paste have a particle size of less than about 16.7 microns, at least about 75% of the water insoluble solids comprising the nut paste have a particle size of less than about 13.0 microns, at least about 60% of the water insoluble solids comprising the nut paste have a particle size of less than about 10.1 microns, at least about 47% of the water insoluble solids comprising the nut paste have a particle size of less than about 7.9 microns, at least about 30% of the water insoluble solids comprises the nut paste have a particle size of less than about 6.2 microns, at least about 16% of the water insoluble particles comprising the nut paste have a particle size of less than about 4.8 microns, and at least about 10% of the water insoluble solids comprising the nut paste have a particle size of less than about 3.8 microns.

Moreover, the particles size distribution curve of the non-water soluble solids comprising the nut paste is centered at from about 7 to about 9 microns. Preferably, the particle size distribution of the non-water soluble solids comprising the nut paste centered at from about 7.5 to about 8.5 microns. The nut paste preferably has a yield value of less than about 100 dynes/square centimeter.

A key to the preparation of a monomodal nut paste as described herein is to significantly increase the fluidity of the paste. The paste must be fluid enough to achieve breakdown of the water insoluble solids comprising the paste to the desired particle size distribution. Preferably, the nut paste has a Casson plastic viscosity of less than about 15 poise, more preferably less than about 10 poise, most preferably less than about 7 poise. Achieving the requisite fluidity of the nut paste is accomplished by 1) milling the paste, and 2) maintaining the fat content of the paste at least about 45%, preferably from about 45% to about 80%. Additionally, processing the nut paste through a high shear operation (Colloid mill or other in-line shearing devices) could be used to lower the paste viscosity.

Milling of the nut paste can be accomplished by a variety of methods. In a preferred embodiment for preparing the nut paste of the present invention, the paste is milled by pumping the paste through a homogenizer, such as a Rannie type #45.175H Homogenizer. The homogenizer is preferably equipped with a cell disruption valve (e.g., a valve with a narrow land). The nut paste is generally pumped through the homogenizer at a rate of either 17,500 lbs/hour or 20,000 lbs/hour. The homogenizer is typically operated at a pressure ranging from about 8,000 psig to about 14,500 psig, preferably from about 9,000 psig to about 13,000 psig, more preferably from about 10,000 psig to about 12,000 psig. The mixture can be passed through the homogenizer from 1 to 3 times. In an especially preferred embodiment of the present invention, the nut paste is passed through the homogenizer once.

Particle size reduction with the homogenizer is achieved when the product passing through the homogenization valve is subjected to very high pressure drop and impact. It is believed that the particles break down as a result of the turbulence induced into the paste and its impingement on the homogenization valve and impact ring. When the viscosity of the paste is high, the effect of turbulence on particle size reduction is decreased because its effect is dampened by the increased visco-elastic nature of the paste. Likewise, when the viscosity of the paste is high, particle size reduction by impact is lessened because particles impinge the valve and impact ring with less force.

The ability to achieve the requisite fluidity for the nut paste is also dependent on the fat content of the nut paste. When the fat content of the nut paste is less than 45%, it is extremely difficult to reduce the water insoluble solids comprising the nut paste to a monomodal particle size distribution or to achieve the desired fineness of grind. Therefore, it is desirable to maintain the fat content of the nut paste at least about 45% until the desired monomodal particle size distribution and the desired fineness of grind has been achieved.

Using a nut paste wherein the water insoluble solids are milled to the particular monomodal particle size distribution described herein has several product and process advantages. In particular, the use of these nut pastes results in a more fluid (e.g., less viscous), smoother (less gritty) and more flavorful product than would otherwise be obtained.

The addition of solids to a nut paste and the mixing of solids with a nut paste are complex because nut butters and spreads are shear thinning materials (e.g., their apparent viscosity decreases as shear rate increases). Obtaining a good flow pattern for uniform mixing in a mix kettle is difficult since the apparent viscosity of the butter at the tip of the mixing blade would be lower than in the middle of the blade because of the difference in shear rate. The mixing problem is further complicated by the fact that the viscosity of the peanut butter is highly sensitive to its fat content; its viscosity increases significantly as level of solids increases and the fat content decreases. As a result, the solids need to be added slowly and the mixing conditions are intense. This leads to an excessively high viscosity for the mixture, and subsequent processing becomes less efficient. Moreover, the intense processing conditions lead to flavor degradation and the inefficient processing leads to more viscous (less creamy, less spreadable) product.

However, when the nut paste is milled so that the water insoluble solids comprising the nut paste have the particular monomodal particle size distribution described herein, mixing efficiency increases. This leads to not only a shorter mix time, but also to a significantly lower viscosity for the nut paste. As a consequence of the lower viscosity, subsequent processing becomes more efficient and less intensive, leading to a product having better flavor. The lower viscosity of the nut paste also increases the efficiency of the homogenizer in reducing product grittiness and in reducing the water insoluble solids and also the added water soluble solids to a liner monomodal particle size distribution. Another effect of the lower viscosity is to lower the pressure drop to heat exchangers after homogenization so that the heat exchangers do not become plugged or overloaded.

Milling the nut paste so that the water insoluble solids comprising the nut paste have the particular monomodal particle size described herein also decreases the effect of solids addition on viscosity so that it becomes possible to prepare a fluid, reduced fat nut spread.

II. Monomodal Nut Butters and Spreads Comprising the Nut Paste Described Herein

The present invention also relates to monomodal full fat nut butters and reduced fat nut spreads which contain the nut paste hereinbefore described. The nut butters and spreads of the present invention have superior fluidity, texture and flavor. These monomodal nut butters and spread, and processes for making them are described in detail as follows.

A. Ingredient

The nut butters and nut spreads according to the present invention typically contain from about 50 to about 100% of the nut paste hereinbefore described nut paste. Full fat nut butters according to the present invention typically comprise from about 90% to about 100% of the nut paste, preferably from about 90% to about 95%. Reduced fat nut spreads according to the present invention typically contain from about 50% to about 90% of the nut paste, preferably from about 50% to about 80% of the nut paste.

The nut butters and nut spreads of the present invention may also optionally contain other ingredients. For example, low calorie oils and zero calorie oils such as sucrose polyesters of long chain fatty acids (olestra) and other polyol polyesters of fatty acids can be used (see for example U.S. Pat. Nos. 3,600,186 to Mattson, et al. and 4,005,196 to Jandacek). Mixed triglycerides made from medium and long chain saturated and/or unsaturated fatty acids can also be used herein. An oil which contains at least 10% medium chain triglycerides can also be used. Medium chain triglycerides contain saturated fatty acids having from six to twelve carbon atoms. Reduced caloric peanut butters containing medium chain triglycerides are described in U.S. Pat. No. 4,863,753 (Hunter, et al., 1989).

The nut spread prepared according to the process of the present invention may also optionally contain a stabilizer. The stabilizer can be any of the known peanut butter stabilizers, for example, hydrogenated rapeseed oil, or other hydrogenated triglycerides having a high proportion of $C_{20}$ and $C_{22}$ fatty acids. (See for example, U.S. Pat. No. 3,597,230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, an emulsifier can be used in the process of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and preferably from 1% to 3% stabilizer or emulsifier is used.

The process described herein can also optionally utilize flavorants. "Flavorants," as the term is used herein, are agents which contribute to or enhance the flavor of the nut butter. These include sweeteners, flavor enhancers, artificial sweeteners, natural and artificial flavors, flavored or candied bits, cereal pieces, nut chunks and other additives which contribute to the flavor of the spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener will be something which has a sweetness intensity about that of sucrose or fructose. Sweeteners are generally added at a level of 0% to about 8%; preferably from about 1% to about 6%.

Artificial sweeteners such as aspartame, acesulfam, saccharine, cyclamate, and glycyrrhizin can also be used. The amount of artificial sweetener used would be that effective to produce the sweetness that is desired; and would be about the equivalent of the addition of from about 1% to 7% of sucrose.

Flavor enhancers including salt or salt substitutes such as potassium chloride, sodium chloride/potassium chloride mixtures, and seasoned salts can also be used. The level of flavor enhancer used is a matter of the desired taste level, but usually is from about 0.1% to about 2%. Other flavorants include natural or artificial peanut flavors, roasted flavors, and praline/caramel flavors, walnut flavors, almond flavors and flavor compositions.

The process of the present invention can also employ nut chunks, and other flavored additives which can be mixed with the peanut spread. These additives include chocolate chips or bits or other flavored bits, e.g. butterscotch and peanuts, jellies, (either low calorie jellies or regular jelly or preserves), and praline nuts or other candies. These additives are usually added at a level of from about 1% to about 20% by weight. Nut chunks and flavored bits can contain fats and oils. Therefore, the addition of these materials can affect the fat content and the calorie level of the nut spread.

B. Method of Preparing the Nut Butters and Spreads of the Present Invention

1. Forming a Nut Paste

The first step in the preparation of the monomodal full fat nut butters or reduced fat nut spreads of the present invention is to prepare a monomodal nut paste of the type described herein. The preparation of such a nut paste was described hereinabove in section I.

2. Depositing the peanut paste into mixing tank

Next, the hereinbefore described homogenized peanut paste is deposited into a mixing tank such as a Hamilton kettle. The peanut paste is then mixed as the solid ingredients are added as described hereinafter in step (C).

3. Mixing the solid ingredients into the tank containing the monomodal peanut paste and passing the resulting mixture through a high shear mixer The next step in the process of the present invention is to add the solid ingredients (other than those contained in the nut paste) to the mixing tank containing the monomodal peanut paste and to mix the ingredients into the peanut paste. The solid ingredients utilized in the process of the present invention can include, for example: diluents such as corn syrup solids, maltodextrin, dextrose, polydextrose, fiber, mono- and disaccharides, starches (e.g., corn, potato, wheat) and flours (e.g., wheat, rye, pea); protein supplements such as additional peanut solids, soy flour, soy concentrate, soy isolate, casein, egg whites, and protein from other animal or vegetable sources; or a combination of the above.

The solid ingredients which are added to the nut paste typically comprise from about 13% to about 50% of the nut spread. Preferably, the solid ingredients comprise from about 38% to about 45% of the nut spread. More preferably, the solid ingredients comprise from about 32% to about 43% of the nut spread.

The solid ingredients and any desired optional ingredients are typically added gradually over a time period ranging from about 15 to about 45 minutes. The mixture of peanut paste and solid ingredients is passed through a high shear mixer such as a colloid mill, and typically a heat exchanger, before proceeding with step (D) described hereinafter.

In a preferred embodiment, as the solid ingredients are gradually added, a portion of the resulting mixture of peanut paste and solid ingredients is simultaneously recycled through a colloid mill and back into the mixing tank, or through a homogenizer, a colloid mill and back into the mixing tank. This recycling is generally continued at least until all of the solids have been added. Typically, but not necessarily, the recycling is continued until the Casson plastic viscosity of the mixture of peanut paste and solids is less than 30 poise.

A heat exchanger may optionally be used after the homogenization and/or after colloid milling to cool the mixture. Use of a heat exchanger can prevent flavor degradation.

4. Adjusting the temperature of the mixture such that the temperature exiting the homogenizer in step (E) will be legs than about 240° F.

The mixing and colloid milling employed in step (C) described hereinabove causes the temperature of the mixture of peanut paste and solids to rise. When the temperature of the mixture exiting the homogenizer (described hereinafter in step (E)) exceeds 240° F. (116° C.), the nut spread will be very viscous due to unfolding, denaturation and oil absorption of the soy proteins as well as carmelization of the sucrose, molasses and corn syrup solids that occurs at these high temperatures. This makes the nut spread extremely difficult to process. However, if the temperature of the mixture as it exits the homogenizer in step (E) described hereinafter is less than about 240° F. (116° C.), the nut spread exiting the homogenizer will be desirably fluid and easy to process.

When the homogenizer is operated at a pressure of 12,000 psig, the temperature of the mixture before it enters the homogenizer should be adjusted to less than about 68° C. (155° F.) to ensure that the temperature of the nut spread exiting the homogenizer does not exceed 240° F. (116° C.). Preferably, when the homogenizer is operated at a pressure of 12,000 psig, the temperature of the mixture entering the homogenizer is from about 66° C. (1 50° F.) to about 68° C. (155° F.). In general, for every 1000 psig increase in pressure, the temperature of the mixture as it exits the homogenizer increases by about 6° F. The temperature of the mixture can be adjusted to within the desired range by any of a number of conventional methods, e.g., the use of heat exchangers.

5. Pumping the mixture containing the peanut paste and the solid ingredients through a homogenizer at a pressure ranging from about 9,000 to about 14,500 psig After the temperature of the mixture has been adjusted as described hereinabove in step (D), the mixture is pumped through a homogenizer, such as a Rannie 45.175H homogenizer, at a pressure ranging from about 8,000 to about 14,500 psig. Preferably, the pressure in the homogenizer ranges from about 9,000 to about 13,000 psig. Most preferably, the pressure in the homogenizer ranges from about 10,000 to about 12,000 psig. The homogenizer is preferably equipped with a cell disruption valve (e.g., a valve with a narrow land).

A heat exchanger may optionally be used after the homogenizer to cool the mixture before it reaches the colloid mill. Use of a heat exchanger can prevent flavor degradation and help to increase the efficiency of the colloid mill.

6. Pumping the homogenized mixture through a colloid mill

Next, the homogenized mixture is pumped through a colloid mill such as a Greerco Colloid Mill to reduce the viscosity of the mixture. Typically, the colloid mill is operated with a 0.055 inch gap at about 3600 rpm.

7. Passing the homogenized, colloid milled mixture through a versator and a scraped wall heat exchanger Finally, the nut spread is finished by passing the mixture through a versator and a scraped wall heat exchanger to increase the oxidative stability of the nut spread product and to set up the crystalline structure of the nut spread. The scraped wall heat exchanger is typically operated such that the freezer outlet temperature is between 97° and 100° F. Chunks or pieces of full fat nuts may be added if desired.

C. Characteristics of the Nut Butter or Nut Spread Product

The final nut butters and nut spread products of the present invention have a Casson plastic viscosity of less than about 17 poise and a yield value below about 300 dynes per square centimeter. The water insoluble solids present in the nut butters and spreads of the present invention have a monomodal particle size distribution such that at least about 90% of the water insoluble solids comprising the nut butter or paste have a particle size of less than about 21.6 microns, at least about 85% of the water insoluble solids comprising the nut butter or spread have a particle size of less than about 16.7 microns, at least about 75% of the water insoluble solids comprising the nut butter or spread have a particle size of less than about 13.0 microns, at least about 60% of the water insoluble solids comprising the nut butter or spread have a particle size of less than about 10.1 microns, at least about 45% of the water insoluble solids comprising the nut butter or spread have a particle size of less than about 7.9 microns and at least about 30% of the water insoluble solids comprising the nut butter or spread have a particle size of less than about 6.2 microns. Preferably, at least about 92% of the water insoluble solids comprising the nut butter or paste have a particle size of less than about 21.6 microns, at least about 87% of the water insoluble solids comprising the nut butter or spread have a particle size of less than about 16.7 microns, at least about 77% of the water insoluble solids comprising the nut butter or spread have a particle size of less than about 13.0 microns, at least about 62% of the water insoluble solids comprising the nut butter or spread have a particle size of less than about 10.1 microns, at least about 47% of the water insoluble solids comprising the nut butter or spread have a particle size of less than about 7.9 microns, at least about 30% of the water insoluble solids comprising the nut butter or spread have a particle size of less than about 6.2 microns and at least about 16% of the water insoluble solids comprising the nut butter or spread have a particle size of less than about 4.8 microns. Most preferably, at least about 92% of the water insoluble solids comprising the nut butter or paste have a particle size of less than about 21.6 microns, at least about 87% of the water insoluble solids comprising the nut butter or spread have a particle size of less than about 16.7 microns, at least about 77% of the water insoluble solids comprising the nut butter or spread have a particle size of less than about 13.0 microns, at least about 62% of the water insoluble solids comprising the nut butter or spread have a particle size of less than about 10.1 microns, at least about 47% of the water insoluble solids comprising the nut butter or spread have a particle size of less than about 7.9 microns, at least about 30% of the water insoluble solids comprising the nut butter or spread have a particle size of less than about 6.2 microns, at least about 16% of the water insoluble solids comprising the nut butter or spread have a particle size of less than about 4.8 microns, and at least about 10% of the water insoluble solids comprising the nut butter or spread have a particle size of less than about 3.8 microns.

The particles size distribution curve of the water insoluble solids comprising the nut butter or spread is centered at from about 7 microns to about 9 microns. More typically, the particle size distribution curve of the water insoluble solids comprising the nut butter or spread is centered at from about 7.5 to about 8.5 microns.

The total solids comprising the nut butter or nut spread have a monomodal distribution curve such that at least about 90% of the solids have a particle size of less than about 40 microns, preferably less than about 38 microns, most preferably less than about 37 microns. The particle size distribution curve of the total solids comprising the nut butter or nut paste is centered at from about 10 to about 11 microns.

The fat content of the nut butters and spreads of the present invention typically ranges from about 25% to about 80%, preferably from about 30% to about 60%. Reduced fat nut spreads typically have a fat content of from about 25% to about 45%, preferably from about 30% to about 40%, more preferably from about 30% to about 35%. Full fat nut butter typically have a fat content ranging from about 45% to about 80%, preferably from about 45% to about 60%.

It has been found that, surprisingly, the peanut butters and peanut spreads of the present invention which contain the monomodal peanut paste hereinbefore described exhibit a combination of superior flavor, fluidity (low viscosity), and creaminess (fineness of grind of solids, particularly water insoluble solids).

ANALYTICAL TEST METHODS

A number of parameters used to characterize elements of the present invention are quantified by particular experimental analytical procedures. Each of these procedures is described in detail as follows:

1. Particle Size Distribution of Water Insoluble Solids in Nut Pastes and in Nut Butters and Spread A. Sample preparation Apparatus 1. Vortex Jr.-Model-K-500 5 Scientific Industries-Bohemia, N.Y. 11716
2. Bandelin Sonorex-Model-RX 106 (Ultrasonic Bath) Bandelin Corp.-Berlin. West Germany
3. IEC Clinical Centrifuge-Model- AF 1752 Damon/IEC Corp.-Median Hts., Mass. 02194
4. Test Tubes with lids-Model-14956-IJ Fisher Scientific-Pittsburgh, Pa. 15218
5. Acetone-Omni/Solv HR EM-AX0110-1 VWR Scientific-Chicago, Ill. 60666
6. Disposable Glass Pipets-#13-678-20A (5¾" length) VWR Scientific-Chicago, Ill. 60666
7. Malvern 2600D Laser Particle Size Analyzer with IBM PS2 Computer; Munhall Company-Worthington, Ohio 43085

Method:

1. Weigh 0.2–0.3 grams (±0.05 grams) of sample into test tube.
2. Add 5.0 grams ±0.1 gram of acetone to test tube containing sample.

3. Mix test tube on the Vortex Shaker for 10 seconds.
4. Place test tube in centrifuge for 10 minutes on the highest speed.
5. Decant liquid, then repeat steps #2 through 4 two times.
6. After last acetone extraction, add 6.0 grams (±0.1 gram) of distilled water to sample in test tube.
7. Mix on Vortex Shaker for 20 seconds.
8. Place test tube in centrifuge for 10 minutes on the highest speed.
9. Decant liquid, then repeat steps #6 through 8 two times.
NOTE:
When using this method on crunchy nut butters and spreads, the above water extraction is done tour times instead of three times and the samples are then placed on Vortex Shaker for 30 seconds instead of 20 seconds.
10. Place 0.50 grams of extracted sample in test tube with 5.0 grams (±0.1 gram) of acetone.
11. Mix sample on Vortex Shaker for 20 seconds.
12. Place test tube in Ultrasonic Bath for at least 3 minutes.

B. Particle Size Analysis

A Malvern 2600D particle size analyzer with an IBM PS/2 computer is used to analyze the particle size of the samples. A transfer piper is used to transfer 5 to 6 drops of the sample to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.02 to 0.5, preferably from 0.2 to 0.3 (20% to 30% of the light energy is reduced).

The apparatus is fitted with a 100 mm lens to determine the particle size of the solids (water insoluble) comprising the paste. A magnetic stirrer is used to ensure that the sample is being dispersed during the readings. Each sample is swept 250 times by the laser for each reading. Each sample is read a minimum of two times with a two (2) minute wait between each reading.

2. Casson Plastic Viscosity and Casson Yield Value of Nut Butter or Spread

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. and all samples are measured at 65° C.

A sample of 14.0 grams of nut spread (unaerated) is placed in the sample cell. The sample cell is then inserted in the jacketed cell holder. To compensate for heat losses through the tubings, etc., the water temperature entering the jacketed cell holder should be a few degrees higher than the desired sample temperature of 65° C. After the temperature of the sample has reached 65° C. the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE 1

| RPM | Time Before Reading (Seconds) |
|---|---|
| 100 | 3 |
| 50 | 6 |
| 20 | 15 |
| 10 | 30 |
| 5 | 60 |

The dial reading and rpm are convened into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the nut spread's viscosity at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the nut spread to start moving. The yield value is measured in dynes per square centimeter. The relationship between the plastic viscosity and the yield value determine how a nut spread will behave in additional processing.

EXAMPLES

Example I describes a monomodal reduced fat creamy peanut spread prepared from a monomodal nut paste of the type described herein. The ingredients used to prepare this peanut spread are as follows:

| Ingredient | % |
|---|---|
| Peanuts | ~61 |
| Molasses, Salt and Sugar | ~8.5 |
| Hardstock Stablizer and Emulsifier | ~2 |
| Soy Protein Isolate | ~5 |
| Corn Syrup Solids | ~23 |
| Vitamins/Minerals | ~0.1 |

The peanuts are roasted at 422° F. and blanched and ground in a Bauer Mill. The ground peanuts are then pumped through a Rannie type #18.72H Homogenizer at a rate of 1200 lbs/hour and at a pressure of 12,000 psig. The homogenized nut paste is then cooled by passing it through a heat exchanger and is deposited in a 100 gallon Hamilton kettle.

The water insoluble particles comprising the nut paste have a monomodal particle size distribution such that 88% of the water insoluble solids comprising the nut paste have a particle size of less than about 21.6 microns, 80% of the water insoluble solids comprising the nut paste have a particle size of less than about 16.7 microns, 70% of the water insoluble solids comprising the nut paste have a particle size of less than about 13.0 microns, 59% of the water insoluble solids comprising the nut paste have a particle size of less than about 10.1 microns, 47% of the water insoluble solids comprising the nut paste have a particle size of less than about 7.9 microns and 31% of the water insoluble solids comprises the nut paste have a particle size of less than about 6.2 microns. The particles size distribution curve of the non-water soluble solids comprising the nut paste is centered at 8.4 microns.

The molasses, stabilizer, and emulsifier are added to the mixing tank containing the nut paste which is held at a constant temperature of 150° F. Mixing continues for about 5 minutes.

Salt and Sugar are then loaded into a K-Tron-35 Twin Screw feeder positioned over the mixing tank and added to the mixing tank at a constant feed rate of 103 lbs/hour. After the sugar and salt have been added, corn syrup solids are loaded into the feeder and then added to the mix tank at the same rate. Lastly, the soy protein isolate is loaded into the feeder and added to the mix tank at the same rate.

Throughout the time that the solids are being added to the peanut paste in the mixing tank, a portion of the tank mixture is pumped through a 5 inch Greerco W-500 H Colloid Mill operated at a wide open gap, a heat exchanger and then redeposited in the mixing tank. This is a recirculating loop at 1200 lbs/hour. After all of the solids have been added, the mixture continues to be recycled through the colloid mill and heat exchanger for 30 minutes.

The mixture is then pumped through a Rannie type #18.72H homogenizer at a pressure of 12,000 psig and then a heat exchanger and a colloid mill and deposited into a tank. The vitamins and minerals are added to the mixture, and the mixture is passed through a conventional peanut butter finishing system. For example, the mixture can be passed through a versator and a scraped wall heat exchanger, and then cooled and passed through picker boxes. Preferably, the temperature is below 50° C.

The finished nut spread has a Casson plastic viscosity of about 17.3 poise and a yield value of 198 dynes per square centimeter. The water insoluble solids comprising the peanut spread product have a monomodal particle size distribution such that 92% of the water insoluble solids comprising the nut spread have a particle size of less than about 21.6 microns, 88% of the water insoluble solids comprising the nut spread have a particle size of less than about 16.7 microns, 80% of the water insoluble solids comprising the nut spread have a particle size of less than about 13.0 microns, 66% of the water insoluble solids comprising the nut spread have a particle size of less than about 10.1 microns, 50% of the water insoluble solids comprising the nut paste have a particle size of less than about 7.9 microns and 32% of the water insoluble solids comprises the nut spread have a particle size of less than about 6.2 microns. The particles size distribution curve of the non-water soluble solids comprising the nut spread is centered at 7.8 microns. The fat content of the nut spread is 34%.

EXAMPLE II

Example II describes a monomodal reduced fat creamy peanut spread prepared from a monomodal nut paste of the type described herein. The ingredients used prepare this peanut spread are the same as described hereinabove in Example I.

A nut paste is prepared as described in Example I. The nut paste is deposited into a 100 gallon Hamilton kettle. The molasses, stabilizer, and emulsifier are added to the mixing tank which is held at a constant temperature of 150° F. Mixing continues for about 5 minutes.

Salt and sugar are then loaded into a K-Tron-35 Twin Screw feeder positioned over the mixing tank and added to the mix tank at a constant rate of 103 lbs/hour. After the sugar and salt have been added, corn syrup solids are then loaded into the feeder and added into the mix tank at the same rate. Lastly, the soy protein isolate is loaded into the feeder and added to the mix tank at the same rate.

Throughout the time that the solids are being added to the peanut paste in the mixing tank, a portion of the tank mixture is pumped through a Gaulin M-3 Homogenizer at 7,000 psig, a heat exchanger, a 5 inch Greerco W-500 H Colloid Mill operated at a wide open gap and then redeposited in the mixing tank. This is recirculating loop at 906 lbs/hour. After all of the solids have been added, the mixture continues to be recycled through the homogenizer, heat exchanger and colloid mill for 30 minutes.

The mixture is then pumped through the Gaulin homogenizer at a pressure of 7,000 psig, a heat exchanger, and a colloid mill. The vitamins and minerals are added to the mixture, and the mixture is passed through a versator and a scraped wall heat exchanger.

The nut mixture is then passed through a typical conventional peanut butter finishing system. The product is cooled and passed through picker boxes. Preferably, the temperature is below 50° C.

The finished nut spread has a Casson plastic viscosity of about 9.3 poise and a yield value of 206 dynes per square centimeter. The water insoluble solids comprising the peanut spread product have a monomodal particle size distribution such that 94% of the water insoluble solids comprising the nut spread have a particle size of less than about 21.6 microns, 89% of the water insoluble solids comprising the nut spread have a particle size of less than about 16.7 microns, 82% of the water insoluble solids comprising the nut spread have a particle size of less than about 13.0 microns, 67% of the water insoluble solids comprising the nut spread have a particle size of less than about 10.1 microns, 52% of the water insoluble solids comprising the nut paste have a particle size of less than about 7.9 microns and 34% of the water insoluble solids comprises the nut spread have a particle size of less than about 6.2 microns. The particles size distribution curve of the non-water soluble solids comprising the nut spread is centered at 7.7 microns. The fat content of the nut spread is 34%.

EXAMPLE III

Example III describes a monomodal reduced fat crunchy peanut spread prepared from a monomodal nut paste of the type described herein. The ingredients used to prepare this peanut spread are as follows:

| Ingredient | % |
| --- | --- |
| Peanuts | ~53 |
| Molasses, Salt and Sugar | ~8 |
| Hardstock Stablizer and Emulsifier | ~2 |
| Soy Protein Isolate | ~6 |
| Corn Syrup Solids | ~31 |
| Vitamins/Minerals | ~0.2 |

A nut paste is prepared as described in Example I. The nut paste is deposited into a 100 gallon Hamilton kettle. The molasses, stabilizer, and emulsifier are added to the mixing tank which is held at a constant temperature of 150° F. Mixing continues for about 5 minutes.

The dry solids are loaded into a K-Tron-35 Twin Screw feeder and fed into the tank at a rate of 106 lbs/hour. Salt and sugar are loaded and fed first, followed by a mixture of corn syrup solids and soy isolate protein.

Throughout the time that the solids are being added to the peanut paste in the mixing tank, a portion of the tank mixture is pumped through a Gaulin M-3 Homogenizer at 7,000 psig, a heat exchanger, a 5 inch Greerco W-500 H Colloid Mill operated at a wide open gap and then redeposited in the mixing tank. This is a recirculating loop at 906 lbs/hour. After all of the solids have been added, the mixture continues to be recycled through the homogenizer, heat exchanger and colloid mill for 30 minutes.

The mixture is then pumped through the Gaulin homogenizer at a pressure of 7,000 psig and then a heat exchanger and a colloid mill. The vitamins and minerals are added to the mixture, and the mixture is passed through a versator and a scraped wall heat exchanger.

The nut mixture is then passed through a typical conventional peanut butter finishing system. The product is cooled and passed through picker boxes. Preferably, the temperature is below 50° C.

The finished nut spread has a Casson plastic viscosity of about 10.1 poise and a yield value of 253 dynes per square centimeter. The water insoluble solids comprising the peanut spread product have a monomodal particle size distribution such that 94.8% of the water insoluble solids comprising the nut spread have a particle size of less than about 21.6 microns, 90.4% of the water insoluble solids comprising the nut spread have a particle size of less than about 16.7 microns, 81.6% of the water insoluble solids comprising the nut spread have a particle size of less than about 13.0 microns, 66.2% of the water insoluble solids comprising the nut spread have a particle size of less than about 10.1 microns, 49.8% of the water insoluble solids comprising the nut paste have a particle size of less than about 7.9 microns, 32.9% of the water insoluble solids comprises the nut spread have a particle size of less than about 6.2 microns 19.2% of the water insoluble solids comprising the nut spread have a particle size of less than about 4.8 microns, and 10.3% of the water insoluble solids having a particle size of less than about 3.8 microns. The particles size distribution curve of the non-water soluble solids comprising the nut spread is centered at 7.9 microns. The fat content of the nut spread is 30%.

Full fat nut granules are added to the spread using a Cherry Burrell fruit mixer. When 15% peanut granules are used, the final nut spread has a fat content of 34%.

EXAMPLE IV

Example IV describes a monomodal reduced fat creamy peanut spread prepared from a monomodal nut paste of the type described herein. The ingredients used to prepare this peanut spread are the same as described hereinabove in Example I.

The peanuts are roasted at 422° F. and blanched and ground in a Bauer Mill. As the peanuts are ground, sugar, salt, hardstock, emulsifier and molasses are added to the base paste. This mixture is then pumped through a Rannie type #45.175H Homogenizer at a rate of 20,000 lbs/hour and at a pressure of 12,000 psig. The homogenized nut paste is then cooled to 150° F. by passing it through a plate and frame heat exchanger, a 7½ inch Greerco Colloid Mill operated at a 0.055 inch gap, and another plate and frame heat exchanger.

The water insoluble particles comprising the nut paste have a monomodal particle size distribution such that 88% of the water insoluble solids comprising the nut paste have a particle size of less than about 21.6 microns, 80% of the water insoluble solids comprising the nut paste have a particle size of less than about 16.7 microns, 80% of the water insoluble solids comprising the nut paste have a particle size of less than about 13.0 microns, 70% of the water insoluble solids comprising the nut paste have a particle size of less than about 10.1 microns, 59% of the water insoluble solids comprising the nut paste have a particle size of less than about 7.9 microns and 47% of the water insoluble solids comprises the nut paste have a particle size of less than about 6.2 microns. The particles size distribution curve of the non-water soluble solids comprising the nut paste is centered at 8.4 microns.

The nut paste is deposited into a 10,000 gallon kettle equipped with a solid dispersion disk. A recycle loop is started wherein a portion of the paste mixture is pumped through a heat exchanger, 7½ inch Greerco W-500 H Colloid Mills operated at a 0.055 inch gap, another heat exchanger, and then redeposited in the mixing tank which is held at a constant temperature of 150° F. This is a recirculating loop at 20,000 lbs/hour.

Solids feed is started right after the recirculating begins. All the solids are added within 50 minutes. The mixture is recycled for about 30 minutes after all the solids have been added.

Next the mixture is passed through a Rannie #45.175H Homogenizer at 12,000 psig, the heat exchanger, the colloid mill, and into a tank. The vitamins and minerals are added to the mixture, and the mixture is passed through a versator and a scraped wall heat exchanger.

The nut mixture is then passed through a typical conventional peanut butter finishing system. The product is cooled and passed through picker boxes. Preferably, the temperature is below 50° C.

The finished nut spread has a Casson plastic viscosity of about 13.6 poise and a yield value of 213 dynes per square centimeter. The water insoluble solids comprising the peanut spread product have a monomodal particle size distribution such that 92.1% of the water insoluble solids comprising the nut spread have a particle size of less than about 21.6 microns, 87.8% of the water insoluble solids comprising the nut spread have a particle size of less than about 16.7 microns, 80.4% of the water insoluble solids comprising the nut spread have a particle size of less than about 13.0 microns, 66.3% of the water insoluble solids comprising the nut spread have a particle size of less than about 10.1 microns, 50.3% of the water insoluble solids comprising the nut paste have a particle size of less than about 7.9 microns, 31.5% of the water insoluble solids comprises the nut spread have a particle size of less than about 6.2 microns, 18.4% of the water insoluble solids comprising the nut spread have a particle size of less than 4.8, and 10.5% of the water insoluble solids comprising the nut spread have a particle size of less than 3.8 microns. The particles size distribution curve of the non-water soluble solids comprising the nut spread is centered at 7.8 microns. The fat content of the nut spread is 34%.

EXAMPLE V

Example V describes a monomodal reduced fat crunchy peanut spread prepared from a monomodal nut paste of the type described herein. The ingredients used to prepare this peanut spread are the same as described hereinabove in Example III.

A monomodal nut paste mixture is prepared as described in Example IV. The nut paste is deposited into a 10,000 gallon kettle equipped with a solid dispersion disk. A recycle loop is started wherein a portion of the paste mixture is pumped through a heat exchanger, 7½ inch Greerco W-500 H Colloid Mills operated at a 0.055 inch gap, another heat exchanger, and then redeposited in the mixing tank which is held at a constant temperature of 150° F. This is a recirculating loop at 20,000 lbs/hour.

Solids feed is started right after the recirculating begins. The solids are added within two hours. When the fat content of the mix is 34%, the mixture is recycled through a homogenizer at 6,000 psig, the heat exchanger and the colloid mills for the remainder of solids addition. When all of the solids have been added, the mixture continues to be recycled for about 30 minutes. Then, the mixture is pumped through a Rannie 45.175H homogenizer at a pressure of 12,000 psig, the heat exchanger, the colloid mill, another heat exchanger and redeposited in the tank. The vitamins and minerals are added to the mixture, and the mixture is passed through a versator and a scraped wall heat exchanger.

The nut mixture is then passed through a typical conventional peanut butter finishing system. The product is cooled and passed through picker boxes. Preferably, the temperature is below 50° C.

The finished nut spread has a Casson plastic viscosity of about 15 poise and a yield value of 267 dynes per square centimeter. The water insoluble solids comprising the peanut spread product have a monomodal particle size distribution such that 94.4% of the water insoluble solids comprising the nut spread have a particle size of less than about 21.6 microns, 88.3% of the water insoluble solids comprising the nut spread have a particle size of less than about 16.7 microns, 77.8% of the water insoluble solids comprising the nut spread have a particle size of less than about 13.0 microns, 62.3% of the water insoluble solids comprising the nut spread have a particle size of less than about 10.1 microns, 46.9% of the water insoluble solids comprising the nut paste have a particle size of less than about 7.9 microns, 29.8% of the water insoluble solids comprises the nut spread have a particle size of less than about 6.2 microns and 16.1% of the water insoluble solids comprising the nut spread have a particle size of less than 4.8 microns. The particles size distribution curve of the non-water soluble solids comprising the nut spread is centered at 8.3 microns. The fat content of the nut spread is 30%.

Full fat nut granules are added to the spread using a Cherry Burrell fruit mixer. When 15% peanut granules are used, the final nut spread has a fat content of 34%.

EXAMPLE VI

Example VI describes a reduced fat peanut spread prepared by a continuous process wherein the solid ingredients are continuously mixed in a twin screw mixing device, e.g., Readco mixer. No recycle stream is employed. The ingredients used to prepare the peanut spread of Example VI are the same as those used in Example I. The peanut paste is prepared as in Example I and the solid ingredients are added all at once. After the solids are added the mixture of peanut paste and solid ingredients is pumped through a 7.5 inch Greerco colloid mill operated at a 0.055 inch gap. Next, the temperature of the mixture is adjusted to about 65.5° C. The mixture is pumped through a Rannie 45.175H homogenizer at a pressure of 12,000 psig and then a heat exchanger, a colloid mill, another heat exchanger and a versator.

The nut spread has a Casson plastic viscosity of less than 17 poise and a yield value of less than 300 dynes per square centimeter. The nut spread has a monomodal particle size distribution such that at least about 90% of the water insoluble solids comprising the nut butter or paste have a particle size of less than about 21.6 microns, at least about 85% of the water insoluble solids comprising the nut butter or spread have a particle size of less than about 16.7 microns, at least about 75% of the water insoluble solids comprising the nut butter or spread have a particle size of less than about 13.0 microns, at least about 60% of the water insoluble solids comprising the nut butter or spread have a particle size of less than about 10.1 microns, at least about 45% of the water insoluble solids comprising the nut butter or spread have a particle size of less than about 7.9 microns and at least about 30% of the water insoluble solids comprising the nut butter or spread have a particle size of less than about 6.2 microns. The particles size distribution curve of the water insoluble solids comprising the nut butter or spread is centered at from about 7 microns to about 9 microns.

What is claimed is:

1. A process for preparing a nut paste, which comprises the steps of:
   a) grinding roasted nuts to form a nut paste;
   b) pumping the nut paste through a homogenizer operated at a pressure ranging from about 8,000 to about 14,500 psig from 1 to 3 times while maintaining the fat content of the nut paste at least about 45% and maintaining the Casson plastic viscosity of the nut paste at less than about 15 poise to provide a nut paste wherein the water insoluble solids have:
      i) a monomodal particle size distribution such that at least about 80% of the water insoluble solids comprising the nut paste have a particle size of less than about 21.6 microns, at least about 75% of the water insoluble solids comprising the nut paste have a particle size of less than about 16.7 microns, at least about 65% of the water insoluble solids comprising the nut paste have a particle size of less than about 13.0 microns, at least about 55% of the water insoluble solids comprising the nut paste have s particle size of less than about 10.1 microns, at least about 45% of the water insoluble solids comprising the nut paste have a particle size of less than about 7.9 microns and at least about 30% of the water insoluble solids comprises the nut paste have a particle size of less than about 6.2 microns; and
      ii) a particle size distribution curve centered at from about 7 to about 9 microns.

2. The process of claim 1 wherein the homogenizer is equipped with a cell disruption valve.

3. The process of claim 2 wherein the homogenizer is operated at a pressure ranging from about 9,000 to about 13,000 psig and wherein the nut paste is pumped through the homogenizer once.

4. The process of claim 3 wherein the fat content of the nut paste is maintained at from about 45 to about 80%.

5. The process of claim 4 wherein the Casson plastic viscosity of the nut paste is maintained at less than about 10 poise.

6. A process for preparing a monomodal nut butter or nut spread, which comprises the steps of:
   a) grinding roasted nuts to form a nut paste:
   b) pumping the nut paste through a homogenizer operated at a pressure ranging from about 8,000 to about 14,500 psig from 1 to 3 times while maintaining the fat content of the nut paste at least about 45% and maintaining the Casson plastic viscosity of the nut paste at less than about 15 poise to provide a nut paste wherein the water insoluble solids have:
  i) a monomodal particle size distribution such that at least about 80% of the water insoluble solids comprising the nut paste have a particle size of less than about 21.6 microns, at least about 75% of the water insoluble solids comprising the nut paste have a particle size of less than about 16.7 microns, at least about 65% of the water insoluble solids comprising the nut paste have a particle size of less than about 13.0 microns, at least about 55% of the water insoluble solids comprising the nut paste have s particle size of less than about 10.1 microns, at least about 45% of the water insoluble solids comprising the nut paste have a particle size of less than about 7.9 microns and at least about 30% of the water insoluble solids comprises the nut paste have a particle size of less than about 6.2 microns; and
  ii) a particle size distribution curve centered at from about 7 to about 9 microns
c) depositing the nut paste of step b) in a mixing tank;
d) mixing additional solid ingredients into the nut paste to form a mixture and passing the mixture through a high shear mixer;
e) adjusting the temperature of the mixture so that the temperature of the mixture as it exits a homogenizer in step (f) is less than about 240° F.;
f) pumping the mixture through a homogenizer at a pressure ranging from about 8,000 to about 14,500 psig;
g) pumping the mixture through a colloid mill; and
h) pumping the mixture through a versator and a scraped wall heat exchanger to provide a nut butter or nut spread product having:
  i) a Casson plastic viscosity of less than about 17 poise;
  ii) a yield value of less than about 300 dynes per square centimeter;
  iii) a monomodal particle size distribution such that at least about 90% of the water insoluble solids comprising the nut butter or spread have a particle size of less than about 21.6 microns, at least about 85% of the water insoluble solids comprising the nut butter or spread have a particle size of less than about 16.7 microns, at least about 75% of the water insoluble solids comprising the nut spread have a particle size of less than about 13.0 microns, at least about 60% of the water insoluble solids comprising the nut butter or spread have a particle size of less than about 10.1 microns, at least about 45% of the water insoluble solids comprising the nut butter or spread have a particle size of less than about 7.9 microns and at least about 30% of the water insoluble solids comprises the nut butter or spread have a particle size of less than about 6.2 microns; and
  iv) a particle size distribution curve that is centered at from about 7 to about 9 microns.

7. The process of to claim 6 wherein the homogenizer is operated at a pressure of from about 9,000 to about 13,000 psig.

8. The process of to claim 7 wherein the high shear mixer used in step (d) is a colloid mill.

9. The process of claim 8 wherein the homogenized mixture of peanut paste and solids is pumped through a heat exchanger before being pumped through the colloid mill in step (g).

10. A process for preparing a monomodal nut butter or nut spread, which process comprises the steps of:

a) grinding roasted nuts to form a nut paste;
b) pumping the nut paste through a homogenizer operated at a pressure ranging from about 8,000 to about 14,500 psig from 1 to 3 times while maintaining the fat content of the nut paste at least about 45% and maintaining the Casson plastic viscosity of the nut paste at less than about 15 poise to provide a nut paste wherein the water insoluble solids have:
  i) a monomodal particle size distribution such that at least about 80% of the water insoluble solids comprising the nut paste have a particle size of less than about 21.6 microns, at least about 75% of the water insoluble solids comprising the nut paste have a particle size of less than about 16.7 microns, at least about 65 % of the water insoluble solids comprising the nut paste have a particle size of less than about 13.0 microns, at least about 55% of the water insoluble solids comprising the nut paste have a particle size of less than about 10.1 microns, at least about 45% of the water insoluble solids comprising the nut paste have a particle size of less than about 7.9 microns and at least about 30% of the water insoluble solids comprises the nut paste have a particle size of less than about 6.2 microns; and
  ii) a particle size distribution curve centered at from about 7 to about 9 microns
c) depositing the nut paste of step b) in a mixing tank;
d) mixing additional solid ingredients into the nut paste to form a mixture and simultaneously recycling a portion of the mixture through a colloid mill and back into the mixing tank;
e) adjusting the temperature of the mixture so that the temperature of the mixture exiting a homogenizer in step (f) will be less than about 240° F.;
f) pumping the tank mixture through the homogenizer at a pressure ranging from about 8,000 to about 14,500 psig;
g) pumping the mixture through a colloid mill; and
h) pumping the mixture through a versator and a scraped wall heat exchanger to provide a nut butter or nut spread product having:
  i) a Casson plastic viscosity of less than about 17 poise;
  ii) a yield value of less than about 300 dynes per square centimeter;
  iii) a monomodal particle size distribution such that at least about 90% of the water insoluble solids comprising the nut butter or spread have a particle size of less than about 21.6 microns, at least about 85% of the water insoluble solids comprising the nut butter or spread have a particle size of less than about 16.7 microns, at least about 75% of the water insoluble solids comprising the nut spread have a particle size of less than about 13.0 microns, at least about 60% of the water insoluble solids comprising the nut butter or spread have a particle size of less than about 10.1 microns, at least about 45% of the water insoluble solids comprising the nut butter or spread have a particle size of less than about 7.9 microns and at least about 30% of the water insoluble solids comprises the nut butter or spread have a particle size of less than about 6.2 microns; and
  iv) a particle size distribution curve that is centered at from about 7 to about 9 microns.

* * * * *